(12) United States Patent
Ha

(10) Patent No.: US 6,423,478 B1
(45) Date of Patent: Jul. 23, 2002

(54) METHOD OF FORMING A WATERMARK IMAGE IN A HYBRID OPTICAL MASTER DISC

(75) Inventor: Bruce L. Ha, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/543,467

(22) Filed: Apr. 5, 2000

(51) Int. Cl.[7] .................................................. G11B 7/26
(52) U.S. Cl. ........................................ 430/321; 430/320
(58) Field of Search ................................ 430/320, 321, 430/945

(56) References Cited

U.S. PATENT DOCUMENTS

| | | | |
|---|---|---|---|
| 5,498,509 A | * | 3/1996 | Shin et al. .................. 430/321 |
| 5,510,163 A | | 4/1996 | Sullivan et al. |
| 5,549,953 A | | 8/1996 | Li |
| 5,607,188 A | * | 3/1997 | Bahns et al. ................. 283/113 |
| 5,958,651 A | * | 9/1999 | van Hoof et al. ............ 430/292 |

FOREIGN PATENT DOCUMENTS

WO    WO 99/04395    * 1/1999

* cited by examiner

Primary Examiner—John A. McPherson
(74) Attorney, Agent, or Firm—Raymond L. Owens

(57) ABSTRACT

A method of forming a watermark image in a hybrid optical master disc is disclosed. The method includes the steps of projecting a watermark image on a photoresist layer of the master disc; exposing a spiral wobbled groove and depressions in the groove in a ROM area thereof; developing the exposed areas of the photoresist layer to provide physical depressions, a physical spiral wobbled groove and a physical watermark image; forming a stamper having the physical features of the developed photoresist layer; replicating the physical features in a plastic substrate with the stamper; and coating the plastic substrate with a recording medium structure to provide a hybrid optical disc having a watermark image in the plastic substrate under the recording medium structure.

11 Claims, 6 Drawing Sheets

METHOD OF FORMING A WATERMARK IMAGE IN A HYBRID OPTICAL MASTER DISC

FIELD OF THE INVENTION

The present invention relates to a method of making a hybrid optical master disc, and more particularly to a method of forming a watermark image in a hybrid optical master disc and replicating the watermark image in hybrid optical disks which are derived from the master disc.

BACKGROUND OF THE INVENTION

Hybrid optical recording discs are discs having a read-only memory (ROM) area and a recordable area for recording or writing data which are usually generated by a computer user and which are recorded on the disc by a recorder controlled by a computer. Such a disc has a substrate which can be formed by injection molding against a master plate (also called a stamper) so that the substrate will have a continuous spiral groove extending from an inner edge to an outer edge of the substrate. The spiral groove is usually a groove which provides data channels on the disc and also provides for tracking of the disc while reading or recording data. The groove is frequency-modulated in a direction normal to the groove and is, therefore, referred to as a wobbled groove or a wobble groove. In the ROM area of a hybrid optical disc the groove is further modulated in the form of depressions which correspond to disc addressing data and to disc program data. The mastered substrate is then coated with a recording medium structure which can include an organic dye layer selected to absorb radiation from an optical recorder to further modify the depressions in the tracks of the ROM area, or to modulate the tracks in the recordable area. Upon coating the dye layer, a reflective layer is formed over this layer. A protective layer, usually of a polymer organic material, is formed over the reflective layer.

The groove of a hybrid optical recording disc, the degree of modulation of the groove, as well as the arrangement of addressing and program data is usually provided in accordance with Orange Book specifications. "Orange Book" is a specification published by Philips Corporation and Sony Corporation which defines key properties of recordable compact disc media and recording performance.

The aforementioned master plate is used to produce numerous plastic disc substrates by embossing or injection molding techniques. Such a master plate is also referred to as a stamper. The stamper, in turn, is produced by metal plating techniques whereby a photoresist master disc having the spiral groove and the data depressions are plated with a metal. The metal layer is then separated from the photoresist master disc and constitutes the stamper which replicates the features of the photoresist master disc in an inverted orientation, i.e. a groove in the photoresist master will be a projection in the stamper. The photoresist master disc comprises a photoresist layer formed over a substrate which is usually a glass substrate. Accordingly, the photoresist master disc is also referred to in the art as a glass master.

Various proposals have been advanced for providing optical storage media such as, for example, conventional optical discs or hybrid optical discs, with indicia which would uniquely identify such discs and which would offer some protection against counterfeiting or copying of an optical storage medium.

For example, Li discloses in U.S. Pat. No. 5,549,953 optical recording media having optically-variable security properties which are achieved by introducing thin film structures having both optically-variable security properties and encoded optical data decodable by optical means. The thin film structures comprise a substrate and a multilayer interference coating carried by the substrate. The encoded data is in the form of bar codes or digital data.

Sullivan et al. describe in U.S. Pat. No. 5,510,163 optical storage media having a visible logo which is produced by a logo coating. The logo coating is sufficiently light absorbing in the visible spectrum to provide a visible contrast between a recording coating and the logo coating.

Thus, the above disclosures are directed to copy protection for optical media. Such protection is provided by introducing thin film structures or a logo coating into an optical medium. While introducing such structures or coatings into or onto an optical recording medium or an optical storage medium provides the intended security features, introduction of additional materials into or onto a recording layer is likely to increase the level of complexity of fabrication of such media and result in a corresponding increase of cost of such media.

SUMMARY OF THE INVENTION

It is an object of the present invention to provide an optical recording or storage medium having medium identification indicia which also offer protection against copying, with the indicia formed directly in an optical recording layer or in an optical storage layer of the medium.

It is an object of the present invention to provide a method of forming a watermark image in a photoresist layer of a hybrid optical master disc.

These and other objects and advantages of the present invention are achieved in a method of forming a watermark image in a hybrid optical master disc for replication in a hybrid optical disc, comprising the steps of:

a) providing a master substrate;

b) coating a photoresist layer over a surface of the master substrate;

c) exposing at a laser beam groove exposure level a continuous spiral wobbled groove in the photoresist layer, the groove extending from a designated read-only memory (ROM) area to a designated recordable area of the master disc, and exposing at a laser beam depression exposure level depressions in the groove in the ROM area in response to data to be recorded therein;

d) projecting a watermark image over at least portions of the ROM area and the recordable area at a watermark exposure level which is lower than the groove exposure level; and e) developing the photoresist layer to provide the continuous spiral wobbled groove, the depressions in the ROM area, and portions of the watermark image remaining in lands between successive turns of the spiral groove.

These and other objects and advantages of the present invention are also achieved in a method of forming a watermark image in a hybrid optical master disc for replicating in a hybrid optical disc, comprising the steps of:

a) providing a master substrate;

b) coating a photoresist layer over a surface of the master substrate;

c) exposing at a laser beam groove exposure level a continuous spiral wobbled groove in the photoresist layer, the groove extending from a designated read-only memory (ROM) area to a designated recordable area of the master disc, and exposing at a laser beam depression exposure level depressions in the groove in the ROM area in response to data to be recorded therein;

d) projecting a watermark image over at least portions of the ROM area and the recordable area at a watermark exposure level which is lower than the groove exposure level;

e) developing the photoresist layer to provide the continuous spiral wobbled groove, the depressions in the ROM area, and portions of the watermark image remaining in lands between successive turns of the spiral groove;

f) making a metal stamper by plating a metal into the developed photoresist layer;

g) replicating the continuous spiral wobbled groove, the depressions in the groove in the ROM area, and the remaining watermark image into a plastic hybrid optical disc substrate by impressing the stamper upon a surface of the plastic substrate; and h) coating the hybrid optical disc substrate with a recording medium structure to provide a hybrid optical disc having a watermark image extending over a portion thereof on the disc substrate under the recording medium structure.

It is a feature of the present invention to provide a method of making a hybrid optical disc with a watermark image which can be accomplished in the process of stamping a spiral groove and depressions in such groove.

It is another feature of the present invention to provide a method of exposing a photoresist layer of a hybrid optical master disc with a watermark image having a halftone portion of exposed and unexposed domains with a spacing between exposed domains being substantially smaller than a spacing between adjacent portions of an exposed spiral wobbled groove and the exposed domains of the watermark image being exposed at an intensity level of a light source which is substantially lower than an intensity level of a laser light beam which is used to exposed the spiral wobbled groove.

It is a still further feature of the present invention to provide a method of making hybrid optical discs by replicating a spiral wobbled groove, depressions in the groove in a ROM area, and a watermark image, developed in a photoresist layer of a hybrid optical master disc, wherein the replicated watermark image is visually discernible but not readable by a reading laser light beam, the watermark image thereby identifying a hybrid optical disc and the watermark image being substantially non-copyable.

It is another feature of the present invention to provide a method of exposing a watermark image in a photoresist layer of a hybrid optical master disc before or after exposing the photoresist layer with a spiral wobbled groove in a ROM area and in a recordable area of the master disc and exposing depressions in the exposed groove in the ROM area of the master disc.

DETAILED DESCRIPTION OF THE INVENTION

Figure 1:
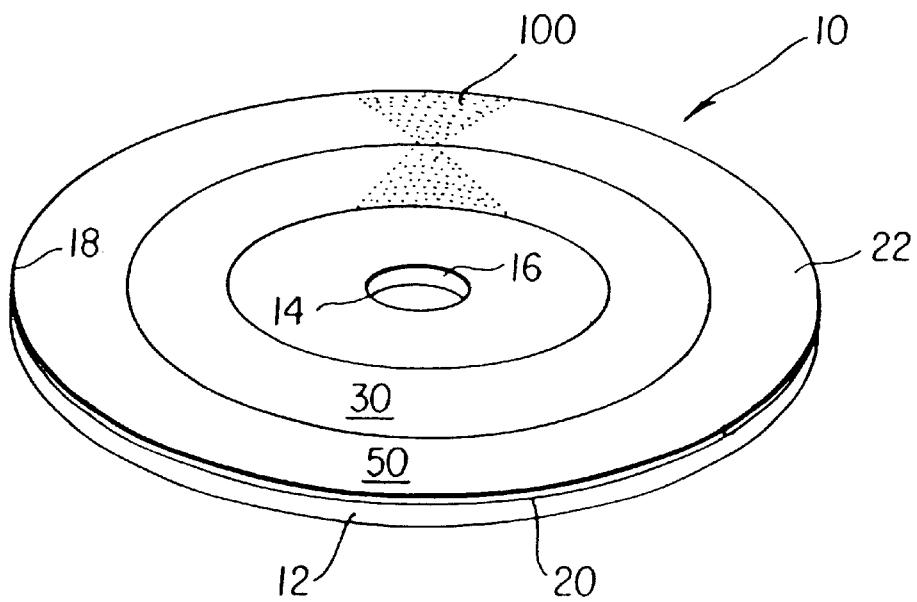
FIG. 1 is a simplified schematic perspective view of a hybrid optical master disc having a photoresist layer disposed on a substrate and showing a ROM area, a recordable area, and an exposed watermark image extending over portions of the ROM and recordable areas.
Figure 2:
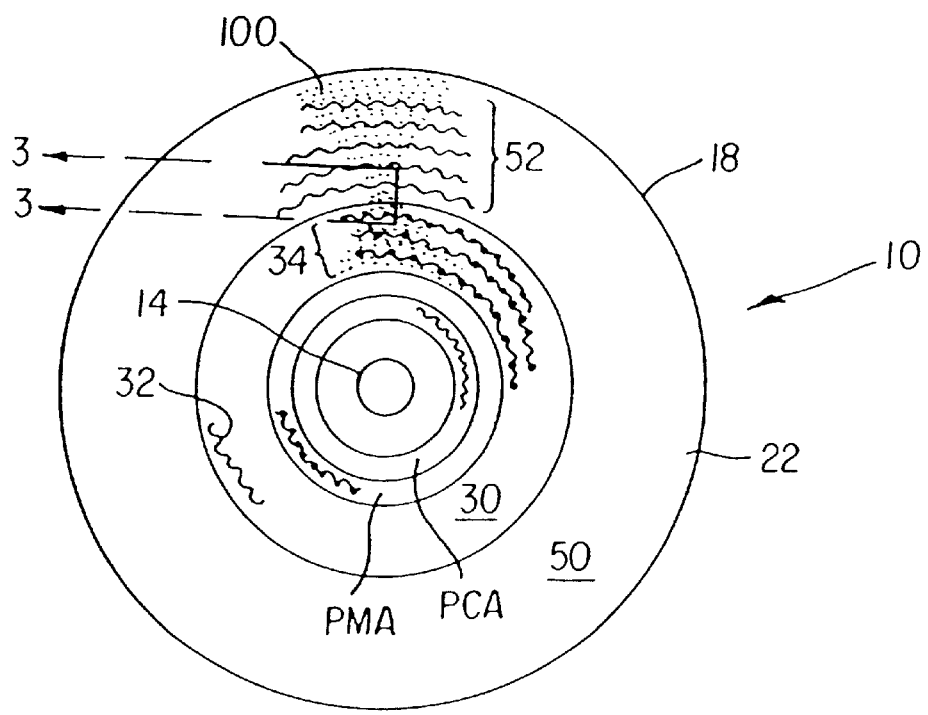
FIG. 2 is a schematic plan view of the master disc of FIG. 1, indicating segments of an exposed wobbled groove and segments of the exposed groove having exposed depressions in the groove, as well as a power calibration area (PCA) and a program memory area (PMA), and an exposed watermark image.

Referring to FIG. 1 and FIG. 2, a hybrid optical master disc 10 is shown in accordance with the present invention. The master disc 10 has a master substrate 12 in which an inner peripheral edge 14 forms a central hole 16, and the disc 10 having an outer peripheral edge 18. The central hole 16 permits the master disc 10 to be mounted in a disc transport device of a laser beam recording system. The master disc 10 includes a read-only memory (ROM) area 30 and a recordable area 50. Overlying the master substrate 12 is a photoresist layer 20 which is responsive to activating radiation of a laser beam in a laser beam recording system such that a laser beam incident on a surface 22 of the photoresist layer 20 will form a pattern of a continuous spiral groove, and of depressions along the portions of the groove which correspond to recorded data in the ROM area upon subsequent development of the photoresist layer 20.

The master substrate 12 is usually formed of glass, but it can also be formed of quartz or of a ceramic material. The photoresist layer 20 is preferably formed by spin-coating of a positive-working photoresist material over a surface of the master substrate, the photoresist being "activated" by exposure to activating radiation having a wavelength in a range from 350–450 nm. The term "activated" relates to a photochemical reaction upon exposure. The photoresist layer has a preferred thickness in a range from 290 to 350 nm.

In accordance with the specification of the "Orange Book", both the ROM area 30 and the recordable area 50 are partitioned. For example, the ROM area 30 is partitioned into a lead-in area, a program area, and a lead-out area. The recordable area likewise is partitioned to include a lead-in area, a program area, and at least one lead-out area. For purposes of clarity of presentation, such lead-in, program, and lead-out areas have been omitted from the drawing of FIG. 2.

Near the inner peripheral edge 14, a power calibration area (PCA) and a program memory area (PMA) are shown.

Segments of a frequency-modulated groove 32 and 52 are schematically indicated in thin wavy outline. Segments of an intensity-modulated and frequency-modulated groove 34 are schematically depicted in the ROM area 30 in wavy outline interspersed with bold dots and dashes to indicate formation of tracks of depressions along such groove segments. The frequency-modulated groove is also called a wobbled groove.

A watermark image 100 is shown in FIGS. 1 and 2 in dotted outline. This watermark image 100 is formed by projecting a selected image onto the photoresist layer's upper surface 22 from a projection system which provides activating radiation. The watermark image 100 can be projected onto the photoresist layer 20 before or after laser beam exposing the continuous spiral 30 wobbled groove (32, 34, and 52 in FIG. 2) and the depressions in the groove in the ROM area 30. The watermark image 100 is shown here, as an illustrative example, to extend over a portion of the ROM area 30 and over a portion of the recordable area 50. The watermark image 100 can be a pictorial image, a message image or some other form of watermark indicia or symbol.

A small section of the hybrid optical master disc 10 of FIG. 2 will be described in greater detail hereinafter. This small section was selected because it captures exposed portions of the spiral groove 52 in the recordable area 50, exposed portions of the spiral groove 34 having exposed depressions therein in the ROM area 30, and exposed portions corresponding to the watermark image 100.

Figure 3A:
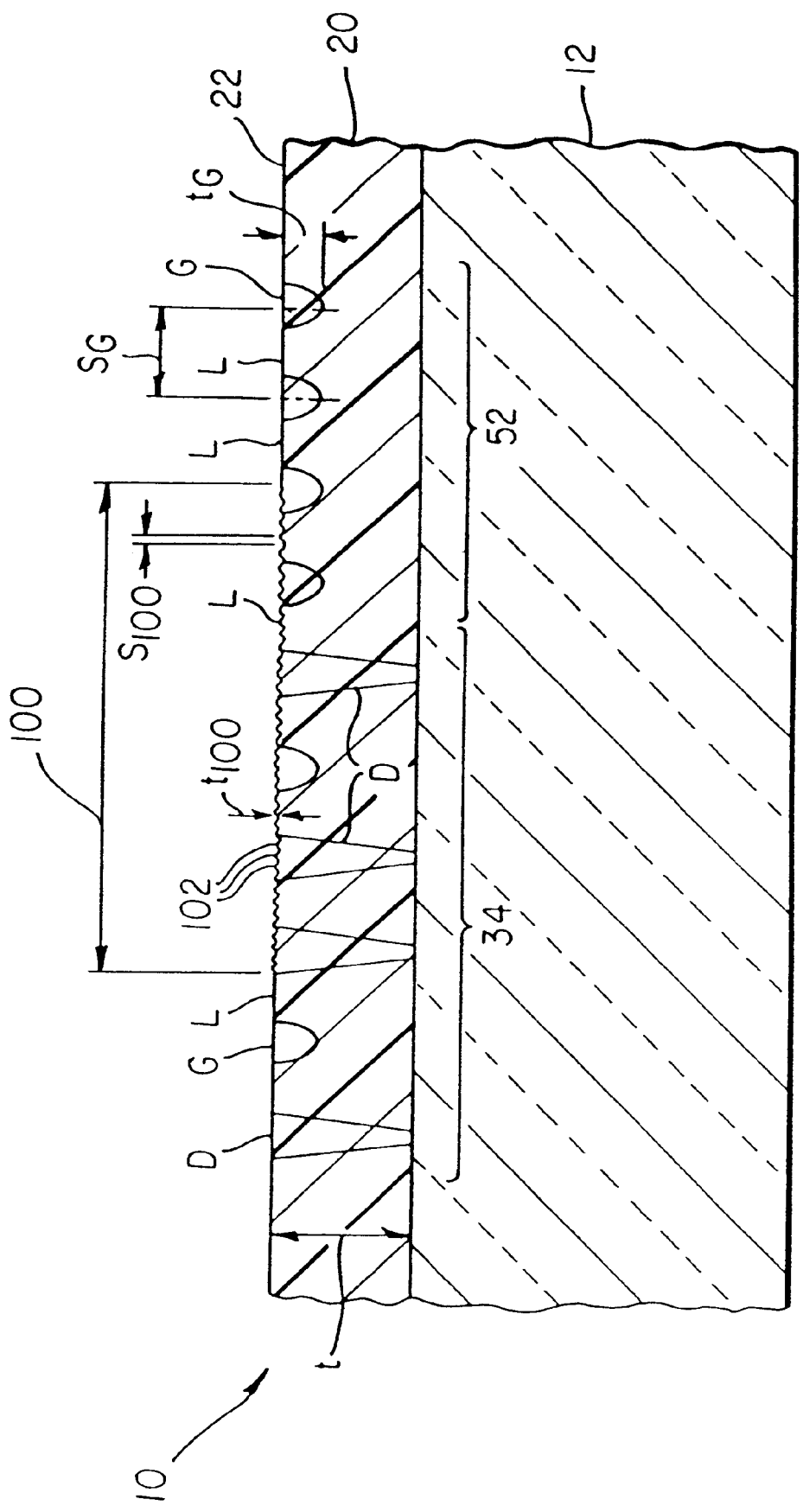
FIG. 3A is a schematic sectional view of a hybrid optical master disc, taken along the section lines 3—3 of FIG. 2, and showing exposed adjacent segments of a spiral groove, exposed depressions in the groove, and exposed watermark image features extending over a portion of the surface of the photoresist layer.

Turning to FIG. 3A, there is depicted a schematic section view of the hybrid optical master disc 10, taken along the section lines 3—3 of FIG. 2. The photoresist layer 20, disposed over the master substrate 12, has a thickness dimension t which is preferably a range from 290 to 350 mn.

Successive turns of the exposed spiral wobbled groove 52 (wobble not shown) in the recordable area 50 (see FIG. 2), and successive turns of the groove 34 in the ROM area 30 (see FIG. 2) are shown together with exposed depressions D in the groove G.

Extending over a portion of the groove (34, 52) is a portion of the exposed watermark image 100. Exposed domains 102 of the watermark image 100 are exposed by projection at a watermark exposure level selected to provide a depth dimension $t_{100}$ of the exposed domains, as measured from the photoresist layer upper surface 22. The depth dimension $t_{100}$ is less than a depth dimension $t_G$ of an exposed groove G. A preferred depth dimension $t_{100}$ of exposed watermark image domains 102 is less than 0.2 times the thickness dimension t of the photoresist layer 20.

The exposed depressions D in the groove G in the ROM area are depicted, for illustrative purposes only, to have been exposed (by a laser beam exposure) to a depth dimension equal to the thickness t of the photoresist layer 20.

Successive turns of the exposed spiral groove G have a spacing $S_G$ which is a periodic spacing governed by specifications in the aforementioned "Orange Book." The successive turns of the exposed groove G are separated by unexposed lands L.

Exposed domains 102 of the watermark image 100 have a spacing $S_{100}$ between adjacent exposed domains. This spacing $S_{100}$ is provided by a halftone pattern overlaid on a projected watermark image 100, or by other means for projecting exposed watermark image domains or features. The spacing $S_{100}$ is less than the spacing $S_G$ between successive turns of the exposed groove G.

Upon developing the exposed regions (groove G, depressions D, and watermark image domains 102) of the photoresist layer 20 by photoresist developing techniques well known to those skilled in the art of lithography, physical depressions D, a physical spiral groove G, and portions of the watermark image remaining in the lands L between successive turns of the spiral groove, are formed in the photoresist layer 20 in correspondence with the exposed features.

A metal stamper (not shown) is then formed by plating a metal, for example nickel, against and into the physical depressions, groove, and watermark image features to provide a stamper having inverted, i.e. raised features on one surface. This stamper is used for replicating the developed groove, depression in the groove, and the watermark image into a plastic hybrid optical disc substrate (not shown) by embossing techniques or by injection molding procedures. This replicated hybrid optical disc substrate is then overcoated with a recording medium structure which can include a recording layer containing a dye, a reflective metallization layer over the recording layer, and a protective layer formed over the metallization layer.

Thus, the watermark image 100 as well as the spiral groove G and the depressions D in the ROM area 30 of the spiral groove G are disposed on the plastic hybrid optical disc substrate under the recording medium structure.

The depth dimension $t_{100}$ and the spacing $S_{100}$ of watermark image domains 102 are selected so that the watermark image is readily visually discernible when viewed through the transparent plastic disc substrate at a tilted angle. However, the watermark image will not be readable by a reading laser beam, for example a reading laser beam in a CD-ROM drive of a computer, nor will the watermark image interfere with subsequent recording of information in the recordable area 50 of the hybrid optical disc.

Figure 3B:
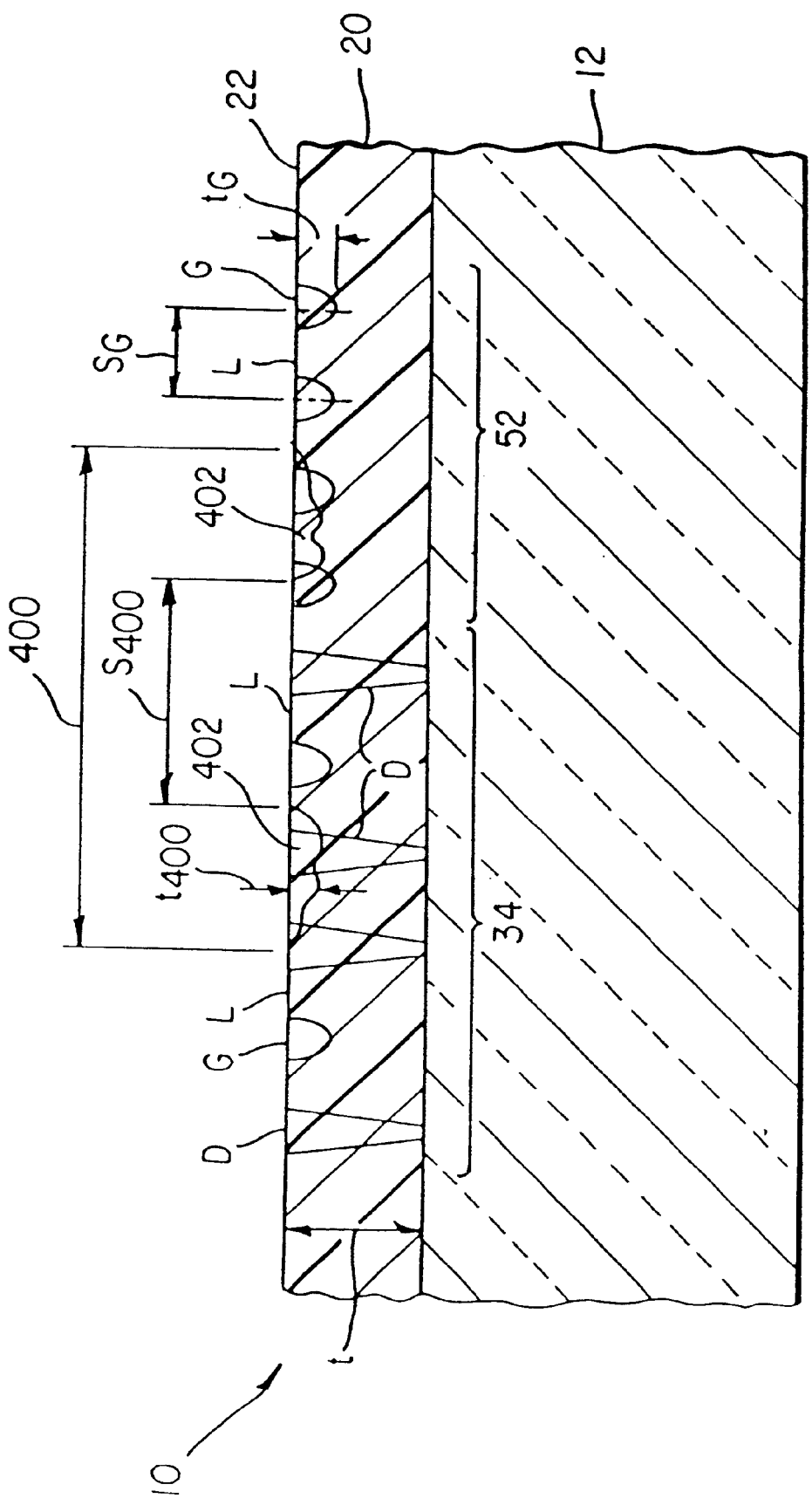
FIG. 3B is a sectional view similar to that of FIG. 3A, except that the exposed watermark image features are features of a diffracted image or of a blurred image.

FIG. 3B is a sectional view similar to that of FIG. 3A, but having a watermark image 400 which is projected onto the surface 22 of the photoresist layer 20 as a diffracted image or as an image having blurred edges. The spacing $S_{400}$ between adjacent exposed domains 402 is larger than the spacing $S_G$ between adjacent turns of the spiral groove G. This watermark image is shown exposed to a depth $t_{400}$ which is less than the depth $t_G$ to which the groove G is exposed, and $t_{400}$ is less than 0.2 times the thickness dimension t of the photoresist layer 20.

Figure 4C:
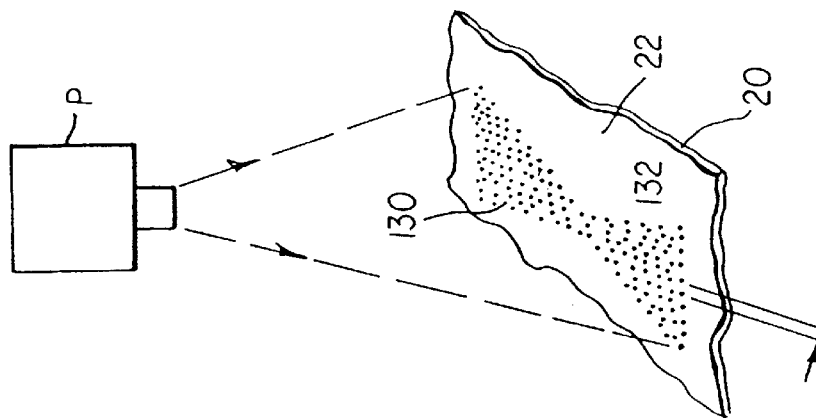
FIGS. 4A–4C show schematically watermark images having different fine structures of halftone patterns provided by projecting each pattern in a photoresist layer of a hybrid optical master disc (for clarity of presentation, a substrate has been omitted from these drawings)
Figure 4B:
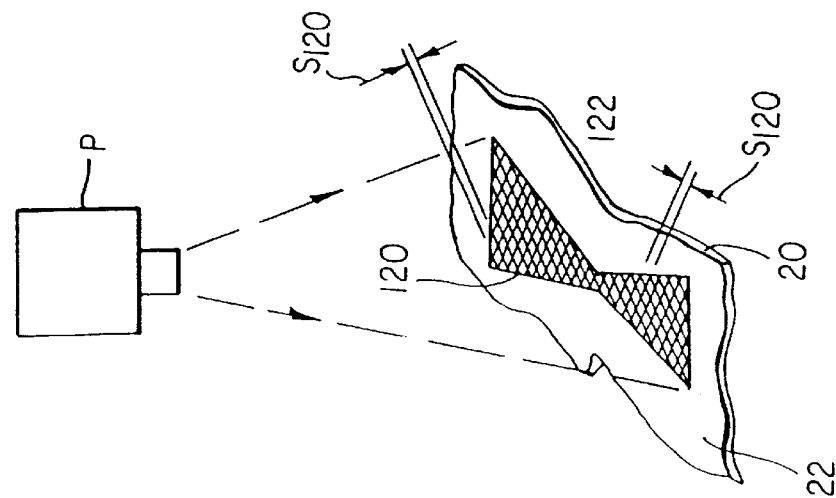
Figure 4A:
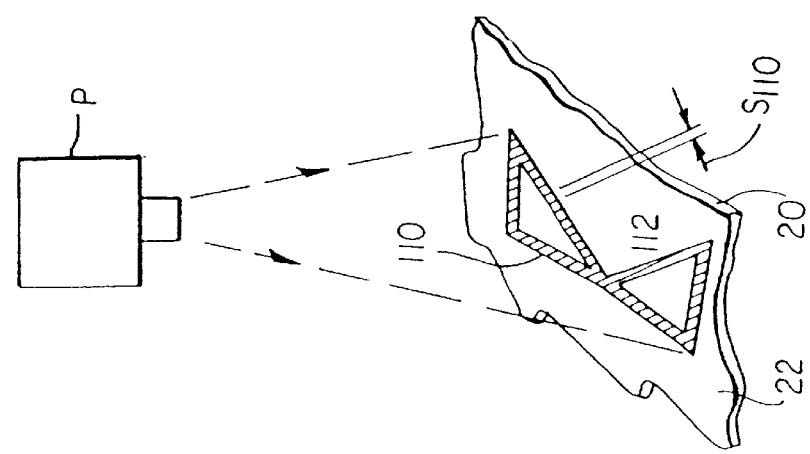

FIGS. 4A, 4B, and 4C show schematically the projecting of watermark images onto the surface 22 of a photoresist layer 20. For clarity of presentation, the master substrate 12 has been omitted from these drawings. The watermark images are illustrative examples.

In FIG. 4A, a projector P projects a watermark image 110 having exposed watermark domains 112 in the photoresist layer 20, with a spacing $S_{110}$ between exposed domains.

In FIG. 4B, a projector P projects a watermark image 120 having exposed watermark domains 122 in the photoresist layer 20, with a spacing $S_{120}$ between exposed domains.

In FIG. 4C, a projector P projects a watermark image 130 having exposed watermark domains 132 in the photoresist layer 20, with a spacing $S_{130}$ between exposed domains.

The watermark images 110, 120, and 130 can be halftone images, as shown schematically. Alternatively, projected watermark images can have watermark domains provided by blurred, defocused, or diffracted light exposure from a projector or from other means for exposing the photoresist layer 20 with a watermark image. For example, a laser light source can be used for exposing a watermark image in the photoresist layer 20.

Figure 5:
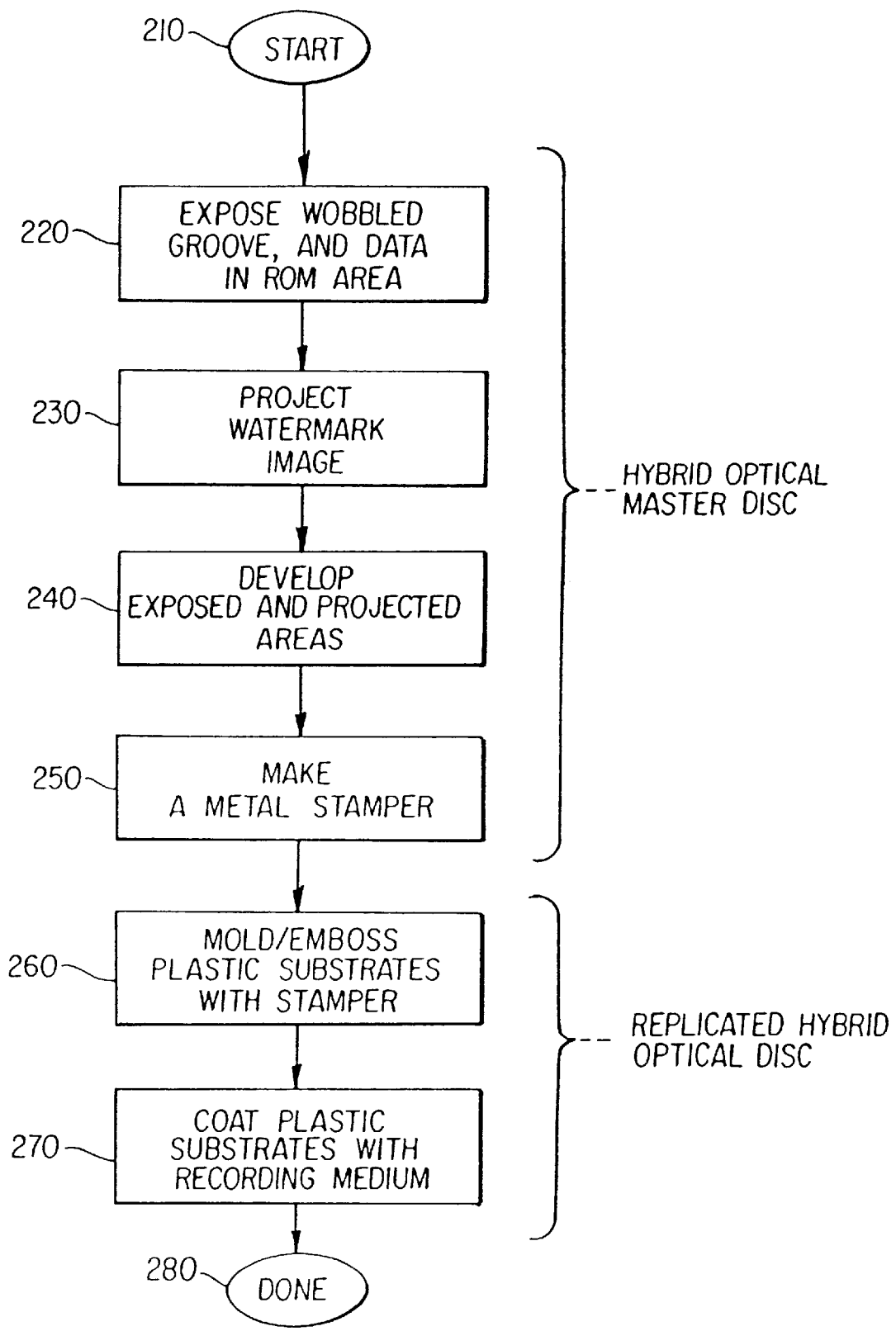
FIG. 5 is a schematic process flow chart which indicates major process steps in fabricating hybrid optical discs from an exposed hybrid optical master disc wherein a watermark image is projected in a second process step.

Turning to FIG. 5, a schematic process flow chart indicates one sequence of steps by which a replicated hybrid optical disc can be fabricated from a hybrid optical master disc.

The process tarts at step 210. In a step 220, a continuous spiral wobbled groove, and depressions in the groove (corresponding to data in a ROM are) are exposed (by laser beam exposure in a laser bean recording system) in a photoresist layer of the master disc.

In a step 230 a watermark image is projected on the photoresist layer.

In a step 240 the exposed groove, the exposed depression in the groove, and the exposed watermark image are developed to provide a finished hybrid optical master disc.

In a step 250 a metal stamper is made of the developed features of the photoresist layer.

In a step 260 a plastic substrate is molded against the stamper or is embossed by the stamper to replicate the spiral wobbled groove, the depressions in the groove, and remaining watermark image features into a surface of the plastic substrate.

In a step 270 the replicated features of the plastic substrate are coated with a recording medium structure to provide a finished replicated hybrid optical disc having a watermark image in the substrate under the recording medium structure.

Step 280 concludes the process.

Figure 6:
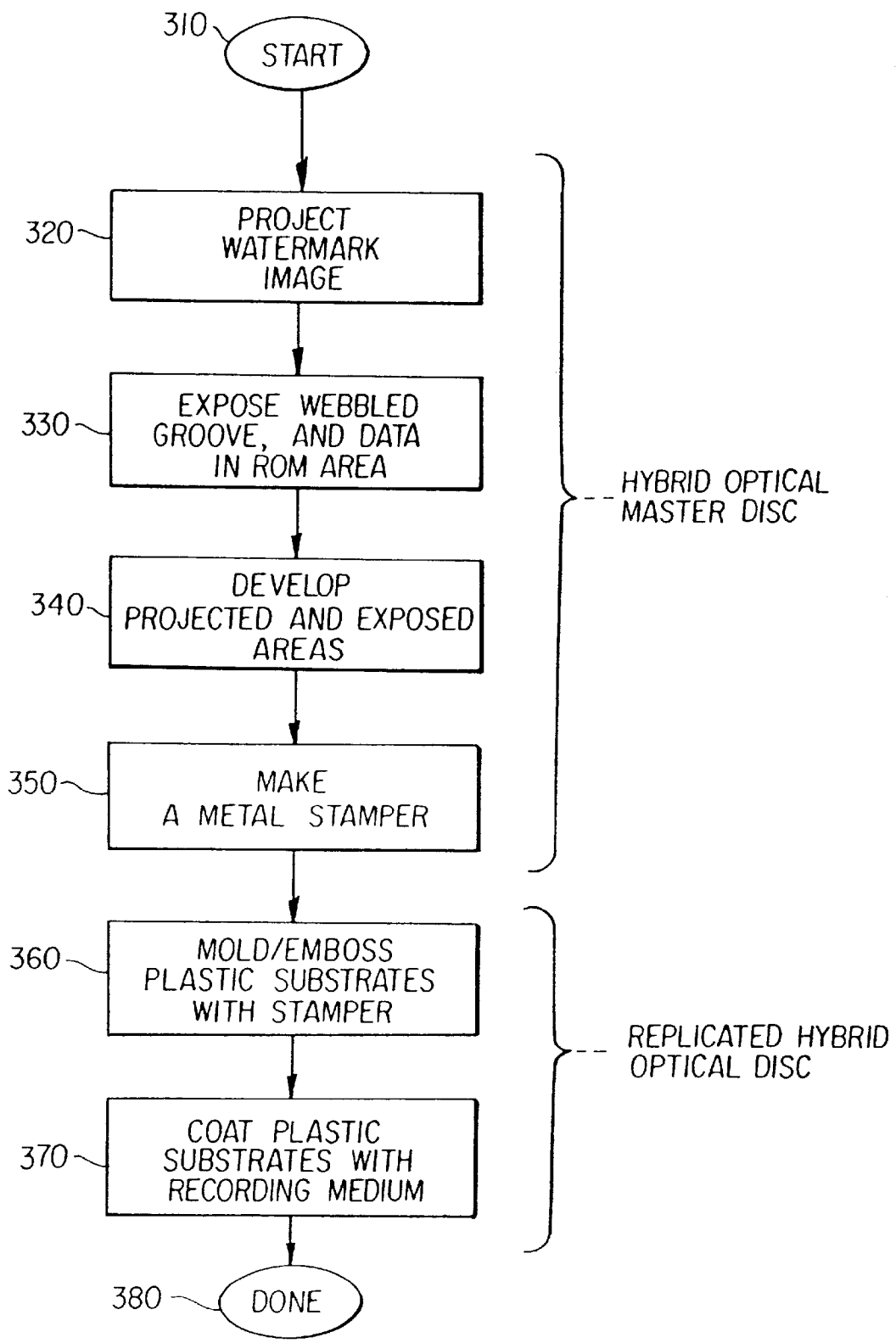
FIG. 6 is a schematic process flow chart similar to that of FIG. 5, except that a watermark image is projected in a first process step.

Turning to FIG. 6, a schematic process flow chart indicates another sequence by which a replicated hybrid optical disc can be fabricated from a hybrid optical master disc.

The process starts at step 310. In a step 320 a watermark image is projected on the photoresist layer.

In a step 330, a continuous spiral wobbled groove, and depression in the groove (corresponding to data in a ROM area) are exposed (by laser bean exposure in a laser beam recording system) in a photoresist layer of the master disc.

In a step 340 the exposed groove, the exposed depression in the groove, and the exposed watermark image are developed to provide a finished hybrid optical master disc.

In a step 350 a metal stamper is made of the developed features of the photoresist layer.

In a step 360 a plastic substrate is molded against the stamper or is embossed by the stamper to replicate the spiral wobbled groove, the depressions in the groove, and remaining watermark image features into a surface of the plastic substrate.

In a step 370 the replicated features of the plastic substrate are coated with a recording medium structure to provide a finished replicated hybrid optical disc having a watermark image in the substrate under the recording medium structure.

Step 380 concludes the process.

The invention has been described in detail with particular reference to certain preferred embodiments thereof, but it will be understood that variations and modifications can be effected within the spirit and scope of the invention.

PARTS LIST

| | |
|---|---|
| 10 | hybrid optical master disc |
| 12 | master substrate |
| 14 | inner peripheral edge |
| 16 | central hole |
| 18 | outer peripheral edge |
| 20 | photoresist layer |
| 22 | upper surface of photoresist layer |
| 30 | ROM area |
| 32 | frequency-modulated groove or wobbled groove |
| 34 | tracks of depression along a frequency-modulated groove |
| 50 | recordable area |
| 52 | frequency-modulated grooves or wobbled groove |
| 100 | watermark image |
| 102 | exposed domains |
| 110 | watermark image |
| 112 | exposed domains |
| 120 | watermark image |
| 122 | exposed domains |
| 130 | watermark image |
| 132 | exposed domains |
| 210–280 | process sequence (first embodiment) |
| 310–380 | process sequence (second embodiment) |
| 400 | watermark image |
| 402 | exposed domains |
| $S_{400}$ | spacing between adjacent exposed watermark domains |
| $t_{400}$ | depth dimension of exposed watermark domains |
| D | exposed depression in exposed groove |
| G | exposed spiral groove |
| L | unexposed lands between exposed turns of a spiral groove |
| P | projector(s) |
| $S_G$ | spacing between successive turns of the exposed spiral groove |
| $S_{100}$ | spacing between adjacent exposed watermark domains |
| $S_{110}$ | spacing between adjacent exposed watermark domains |
| $S_{120}$ | spacing between adjacent exposed watermark domains |
| $S_{130}$ | spacing between adjacent exposed watermark domains |
| t | thickness dimension of photoresist layer |
| $t_G$ | depth dimension of exposed groove |
| $t_{100}$ | depth dimension of exposed watermark domains |

What is claimed is:

1. A method of forming a watermark image in a hybrid optical master disc for replication in a hybrid optical disc, comprising the steps of:

a) providing a master substrate;

b) coating a photoresist layer over a surface of the master substrate to form a photoresist layer having a thickness in a range from 290 to 350 nm;

c) exposing at a laser beam groove exposure level a continuous spiral wobbled groove in the photoresist layer, the groove extending from a designated read-only memory (ROM) area to a designated recordable area of the master disc, and exposing at a laser beam depression exposure level depressions in the groove in the ROM area in response to data to be recorded therein;

d) projecting a watermark image over at least portions of the ROM area and the recordable area at a watermark exposure level which is lower than the groove exposure level; and e) developing the photoresist layer to provide the continuous spiral wobbled groove, the depressions in the ROM area, and portions of the watermark image remaining in lands between successive turns of the spiral groove.

2. The method of claim 1 wherein the watermark image projecting step d) includes projecting a diffracted or a blurred image comprised of a plurality of exposed domains having a spacing between adjacent exposed watermark domains which is larger than a spacing between successive turns of the exposed spiral groove.

3. A method of forming a watermark image in a hybrid optical master disc for replication in a hybrid optical disc, comprising the steps of:

a) providing a master substrate;

b) coating a photoresist layer over a surface of the master substrate to form a photoresist layer having a thickness in a range from 290 to 350 nm;

c) exposing at a laser beam groove exposure level a continuous spiral wobbled groove in the photoresist layer, the groove extending from a designated read-only memory (ROM) area to a designated recordable area of the master disc, and exposing at a laser beam depression exposure level depressions in the groove in the ROM area in response to data to be recorded therein;

d) projecting a watermark image over at least portions of the ROM area and the recordable area at a watermark exposure level which is lower than the groove exposure level;

e) developing the photoresist layer to provide the continuous spiral wobbled groove, the depressions in the ROM area, and portions of the watermark image remaining in lands between successive turns of the spiral groove;

f) making a metal stamper by plating a metal into the developed photoresist layer;

g) replicating the continuous spiral wobbled groove, the depressions in the groove in the ROM area, and the remaining watermark image into a plastic hybrid optical disc substrate by impressing the stamper upon a surface of the plastic substrate; and h) coating the hybrid optical disc substrate with a recording medium structure to provide a hybrid optical disc having a watermark image extending over a portion thereof on the disc substrate under the recording medium structure.

4. The method of claim 3 wherein the watermark image projecting step d) includes projecting a halftone image comprised of a plurality of exposed domains having a spacing between adjacent exposed watermark domains which is less than a spacing between successive turns of the exposed spiral groove.

5. The method of claim 4 wherein the groove has a depth dimension $t_G$ and further including the step of selecting a watermark exposure level which will provide a depth dimension of exposed watermark domains which is less than the depth dimension $t_G$ of the exposed spiral groove.

6. The method of claim 5 wherein the photoresist layer has a thickness t and further includes selecting a watermark exposure level which will provide a depth dimension of exposed watermark domains which is less than 0.2 times the thickness t of the photoresist layer.

7. A method of forming a watermark image in a hybrid optical master disc for replication in a hybrid optical disc, comprising the steps of:

a) providing a master substrate;

b) coating a photoresist layer over a surface of the master substrate to form a photoresist layer having a thickness in a range from 290 to 350 nm;

c) projecting a watermark image over at least portions of a designated read-only memory (ROM) area and portions of a designated recordable area of the master disc at a selected watermark exposure level;

d) exposing at a laser beam groove exposure level a continuous spiral wobbled groove in the photoresist layer, the groove extending from the designated ROM area to a designated recordable area of the master disc, and exposing at a laser beam depression exposure level depressions in the groove in the ROM area in response to data to be recorded therein;

e) developing the photoresist layer to provide the continuous spiral wobbled groove, the depressions in the ROM area, and portions of the watermark image remaining in lands between successive turns of the spiral groove;

f) making a metal stamper by plating a metal into the developed photoresist layer;

g) replicating the continuous spiral wobbled groove, the depressions in the groove in the ROM area, and the remaining watermark image into a plastic hybrid optical disc substrate by impressing the stamper upon a surface of the plastic substrate; and h) coating the hybrid optical disc substrate with a recording medium structure to provide a hybrid optical disc having a watermark image extending over a portion thereof on the disc substrate under the recording medium structure.

8. The method of claim 7 wherein the watermark image projecting step c) includes projecting a halftone image comprised of a plurality of exposed domains having a spacing between adjacent exposed watermark domains which is less than a spacing between successive turns of the exposed spiral groove.

9. The method of claim 8 further including the step of selecting a watermark exposure level which will provide a depth dimension of exposed watermark domains which is less than a depth dimension of the exposed spiral groove.

10. The method of claim 9 wherein the groove has a depth dimension $t_G$ and further including the step of selecting a watermark exposure level which will provide a depth dimension of exposed watermark domains which is less than the depth dimension to of the exposed spiral groove.

11. The method of claim 7 wherein the watermark image projecting step c) includes projecting a diffracted or a blurred image comprised of a plurality of exposed domains having a spacing between adjacent exposed watermark domains which is larger than a spacing between successive turns of the exposed spiral groove.

* * * * *